(12) United States Patent
Reiner

(10) Patent No.: US 6,474,558 B1
(45) Date of Patent: Nov. 5, 2002

(54) DATA CARRIER FOR OPERATION WITH AND WITHOUT CONTACTS

(75) Inventor: Robert Reiner, Neubiberg (DE)

(73) Assignee: Infineon Technologies AG, Munich (DE)

( * ) Notice: Subject to any disclaimer, the term of this patent is extended or adjusted under 35 U.S.C. 154(b) by 95 days.

(21) Appl. No.: 09/642,846

(22) Filed: Aug. 17, 2000

Related U.S. Application Data

(63) Continuation of application No. PCT/EP99/00848, filed on Feb. 4, 1999.

(30) Foreign Application Priority Data

Feb. 17, 1998  (EP) .............................................. 98102788

(51) Int. Cl.$^7$ .............................................. G06K 19/06
(52) U.S. Cl. ...................................... 235/492; 235/441
(58) Field of Search ................................ 235/492, 441, 235/375, 486, 487, 439, 380, 382.5, 382; 701/210, 208; 902/4, 26, 25

(56) References Cited

U.S. PATENT DOCUMENTS

| | | | | |
|---|---|---|---|---|
| 5,521,590 A | * | 5/1996 | Hanaoka et al. | 340/825.54 |
| 6,011,488 A | * | 1/2000 | Busser | 340/825.54 |
| 6,045,043 A | * | 4/2000 | Bashan et al. | 235/441 |
| 6,168,083 B1 | * | 1/2001 | Berger et al. | 235/492 |
| 6,323,566 B1 | * | 11/2001 | Meier | 340/825.31 |
| 6,323,728 B1 | * | 11/2001 | Schmitt-Landsiedel et al. | 329/347 |

FOREIGN PATENT DOCUMENTS

| | | |
|---|---|---|
| DE | 39 35 364 C1 | 8/1990 |
| DE | 195 31 372 A1 | 2/1997 |
| EP | 0953936 A1 * | 3/1999 |
| EP | 1 100 045 A1 * | 5/2001 |
| FR | 2 752 076 A1 | 2/1998 |

OTHER PUBLICATIONS

International Publication WO 96/38814 (Berger et al.), dated Dec. 5, 1996.

* cited by examiner

*Primary Examiner*—Thien M. Le
(74) *Attorney, Agent, or Firm*—Laurence A. Greenberg; Werner H. Stemer; Ralph E. Locher

(57) ABSTRACT

A data carrier, in particular a chip card, includes a first logic circuit, a contactless interface circuit, at least one coil in which a signal is induced, a controllable switching element, contacts for receiving at least one DC supply voltage, a clock signal, and a data signal, and a second logic circuit. The coil is connected to the first logic circuit through the contactless interface circuit, which obtains from the induced signal the DC supply voltage, the clock signal and the data signal corresponding to a modulation of the induced signal. The contacts are connected to the first logic circuit and have at least one supply-voltage contact receiving the DC supply voltage and a clock-signal contact receiving the clock signal. The supply-voltage contact is connected to the first logic circuit through the switching element. The input side of the second logic circuit is connected to the clock-signal contact and the output side is connected to a control input of the switching element.

4 Claims, 2 Drawing Sheets

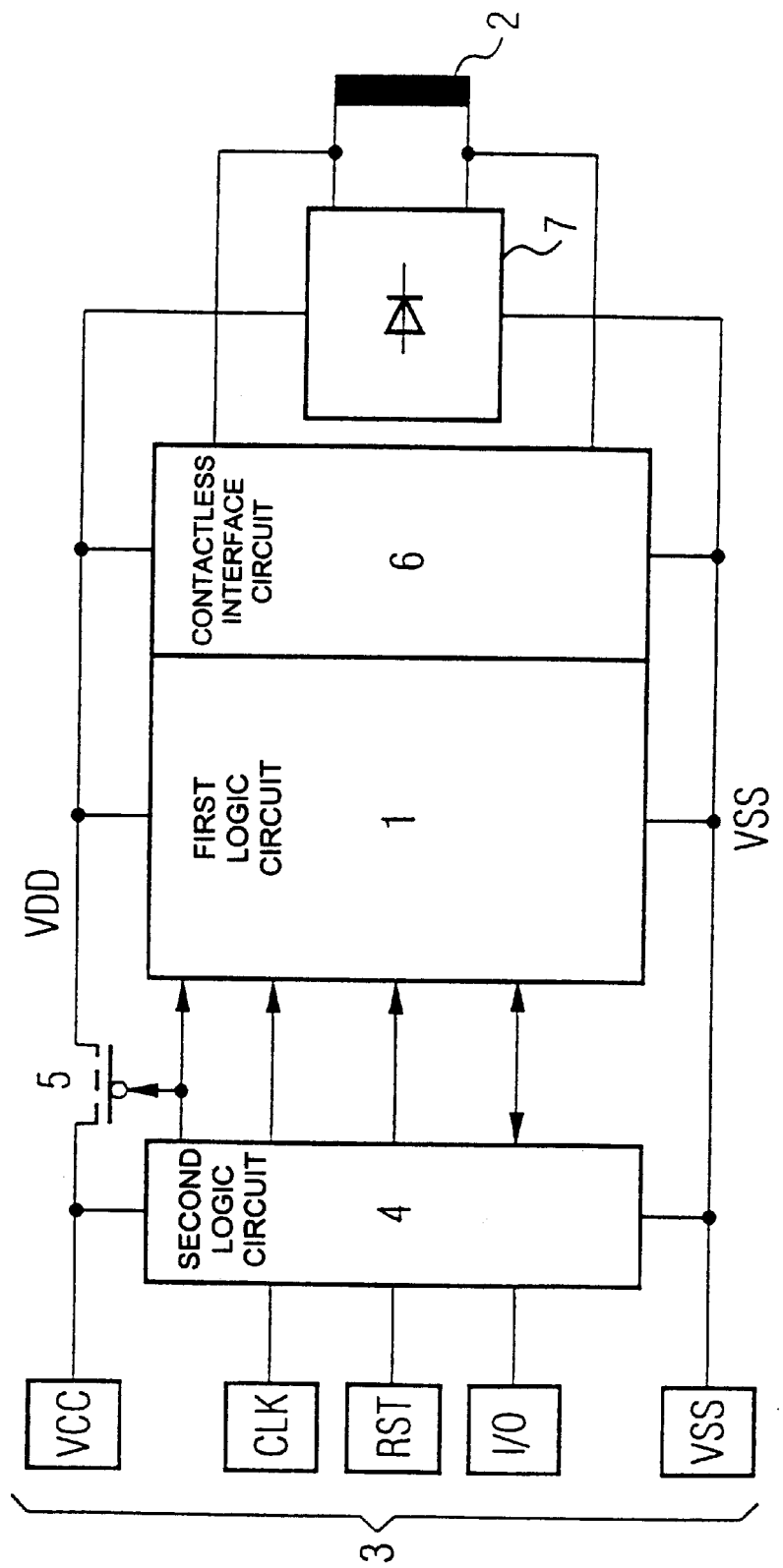

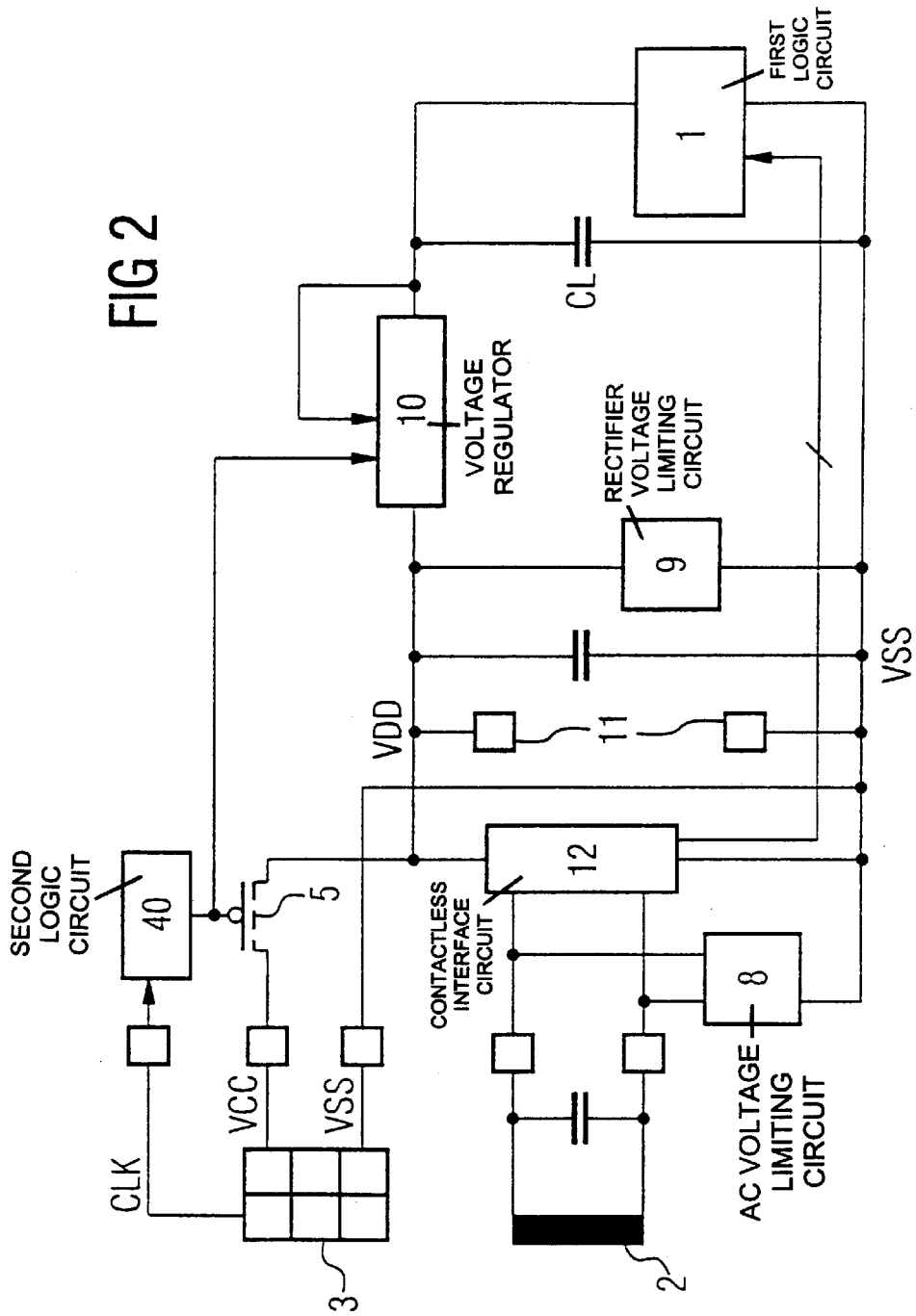

DATA CARRIER FOR OPERATION WITH AND WITHOUT CONTACTS

CROSS-REFERENCE TO RELATED APPLICATION

This application is a continuation of International Application No. PCT/EP99/00848, filed Feb. 4, 1999, which designated the United States.

BACKGROUND OF THE INVENTION

FIELD OF THE INVENTION

The invention relates to a data carrier with a first circuit. The data carrier has a coil connected to the first circuit through a contactless interface. The contactless interface obtains, from a signal induced in the coil, at least one DC supply voltage, a clock signal, and a data signal corresponding to a modulation of the induced signal, and with a number of contacts connected to the first circuit for receiving at least one supply voltage, a clock signal, and a data signal. The supply-voltage contact is connected to the first circuit through a switching element.

A data carrier is disclosed in International PCT publication WO 96/38814. That data carrier is configured as a chip card, more precisely, as a combination chip card. Data carriers according to the invention can, however, also be realized with different forms of housing. In the case of the prior art data carrier, a diode is disposed between the supply-voltage contact and a logic circuit with such a polarity that it prevents the DC supply voltage present at the output of the rectifier of the contactless interface, likewise connected to the same supply voltage input of the logic circuit, from punching through to the contact. However, such a diode requires a certain minimum voltage in order for it to conduct at all and has, in the forward mode, a voltage drop having a disruptive effect if a low supply voltage is desired.

German Published, Non-Prosecuted Patent Application DE 195 31 372 A1 discloses a chip card suitable for operation with and without contacts. A switch is provided that makes it possible for a voltage at the supply contact to be switched through to a memory in a manner depending only on the state of a control signal of a microprocessor, otherwise the switch connects it for contactless operation. In the case of the chip card, the switch also prevents operation of the microprocessor from the contactless interface.

SUMMARY OF THE INVENTION

It is accordingly an object of the invention to provide a data carrier for operation with and without contacts that overcomes the hereinafore-mentioned disadvantages of the heretofore-known devices of this general type and that prevents a voltage induced in the coil at the supply voltage contact and has no appreciable voltage drop in the forward mode at a blocking element bringing this about. In addition, the data carrier ensures access to a microprocessor with and without contacts with equal authorization in terms of the circuitry provided.

With the foregoing and other objects in view, there is provided, in accordance with the invention, a data carrier including a first logic circuit, a contactless interface circuit, at least one coil in which a signal is induced, the at least one coil connected to the first logic circuit through the contactless interface circuit, the contactless interface circuit obtaining from the induced signal at least one DC supply voltage, a clock signal and a data signal corresponding to a modulation of the induced signal, a controllable switching element having a control input, contacts for receiving the at least one DC supply voltage, the clock signal, and the data signal, the contacts being connected to the first logic circuit and having at least one supply-voltage contact receiving the at least one DC supply voltage and a clock-signal contact receiving the clock signal, the at least one supply-voltage contact being connected to the first logic circuit through the switching element, and a second logic circuit having an input side and an output side, the input side connected to the clock-signal contact and the output side connected to the control input of the switching element.

An object of the invention is achieved by having the first circuit be a logic circuit, by the switching element having a controllable configuration, and by a second logic circuit being connected on the input side to the clock-signal contact and on the output side to the control input of the switching element.

In integrated circuit technology, controllable switching elements are usually configured as transistors and have only a very low forward resistance so that the voltage drop across such a switching element during operation of the data carrier through the contacts is negligible. In addition, the low voltage drop means that lower supply voltages are also possible. According to the invention, the presence of a clock signal is necessary for the conductivity switching of the switching element. A second logic circuit is provided to establish the presence of the clock signal and activate the switching element correspondingly.

In accordance with another feature of the invention, the second logic circuit has a rectifier element for obtaining a supply voltage from the clock signal.

In an advantageous development of the invention, the second logic circuit may be both autonomous, that is, obtain its supply voltage from the clock signal, and be connected to the supply voltage.

Using the clock signal as a criterion for switching through of the supply voltage to the first logic circuit has the advantage that the precondition of the presence of a clock signal is not a restrictive condition. This is true because the first logic circuit would not operate without the clock signal, even if the supply voltage were present. Consequently, a signal that is already necessary is used in an advantageous way as a switching condition.

In accordance with a further feature of the invention, the second logic circuit is connected to the at least one supply-voltage contact.

In accordance with an added feature of the invention, there is provided a voltage regulator having a regulator control input, the voltage regulator being connected upstream of the first logic circuit, the output side of the second logic circuit being connected to the regulator control input.

Contactless operation usually requires a supply voltage regulator because the operating voltage of the data carrier is obtained from the signal received from the coil and the amplitude of the signal can fluctuate considerably due to its dependence on the distance of the data carrier from a transmitter. The regulated voltage is usually lower than the voltage supplied by the contacts. Thus, the regulator would be overloaded when operated with contacts. In a development according to the invention, the output signal of the second logic circuit, detecting the clock signal, is used for deactivating the regulator.

In accordance with a concomitant feature of the invention, the data carrier is a chip card.

Other features that are considered as characteristic for the invention are set forth in the appended claims.

Although the invention is illustrated and described herein as embodied in a data carrier for operation with and without contacts, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a block circuit diagram of a data carrier according to the invention; and FIG. 2 is a block circuit diagram of an alternative data carrier according to the invention.

DESCRIPTION OF THE PREFERRED EMBODIMENTS

In all the figures of the drawing, sub-features and integral parts that correspond to one another bear the same reference symbol in each case.

Referring now to the figures of the drawings in detail and first, particularly to FIG. 1 thereof, there is shown a first logic circuit 1 that is preferably a microprocessor. In addition, the first logic circuit 1 is intended to have the circuits usually necessary and appropriate for the operation of a microprocessor, i.e., a RAM, a ROM, or a non-volatile memory. The first logic circuit 1 is connected to two supply voltage lines VDD and VSS. The supply voltage lines VDD and VSS are connected to a rectifier and smoothing network 7, which derives the operating voltage necessary for contactless operation of the data carrier from a signal received from a coil 2.

In addition, the supply voltage lines VDD, VSS are connected to contacts VCC, VSS of a contact bank 3, in order to make the supply voltage available for parts of the circuit when the data carrier operates with contacts.

According to the invention, the supply voltage line VDD is connected to the supply voltage contact VCC through a switching element 5 configured as a PMOS transistor. A second logic circuit 4 activates the switching element 5, which for its part is connected to the clock-signal contact CLK. The second logic circuit 4 detects the presence of a clock signal at the clock-signal contact CLK and, in the presence of a clock signal, activates the switching element 5 so that the supply voltage contact VCC is connected to the supply voltage line VDD and, consequently, the first logic circuit 1 is supplied with a supply voltage by the contacts 3.

The output of the second logic circuit 4, indicating the presence of a clock signal, is also connected directly to the first logic circuit 1 to indicate to the first logic circuit that the supply voltage is coming from the contacts 3. The first logic circuit 1 can then use the information to assume a certain operating state, in which, for example, certain access rights to the memory area are set.

In the embodiment according to FIG. 1, the second logic circuit 4 is also connected to a reset terminal RST and an input/output terminal I/O and passes on the signals originating from there to the first logic circuit 1. Advantageously, the second logic circuit 4 may contain protective structures and filters. In the example according to FIG. 1, the second logic circuit 4 is connected to the supply voltage contacts VCC, VSS and, consequently, can process the incoming clock, reset, and input/output signals only when a supply voltage is present.

The data carrier according to FIG. 1 also has a contactless interface circuit 6, which pre-processes the signal received from the coil 2, in particular, obtains from the coil 2 a clock signal and the data contained due to a modulation of the signal, and passes it on to the first logic circuit 1.

Consequently, the data-processing first logic circuit 1 of the data carrier according to FIG. 1 is always connected through the supply lines VDD, VSS to the coil 2 representing the contactless receiving part, while a connection to the supply voltage contacts of the contact bank 3 takes place through a switching element 5 only if a clock signal is supplied by the contact bank 3. As a result, the switching element 5 effectively prevents the supply voltage supplied by the coil 2 through the rectifier and smoothing circuit 7 from also being present at the contact bank 3 and from being able to be shorted there, for example, by a finger resting on it. On the other hand, the voltage drop across the controlled switching element 5 in operation with contacts through the contacts 3 is only very small. Moreover, the signal from the second logic circuit 4 activating the switching element 5 can also be used to indicate to the first logic circuit 1 that the supply voltage is coming from the contact bank 3. These features are necessary because, in contrast with German Application DE 195 31 372 A1, the microprocessor contained in the first logic circuit 1 is connected with fully equal access authorization, in terms of the circuitry provided, both to the contactless interface and to the interface with contacts and can, therefore, also be activated through the coil 2.

Represented in FIG. 2 is a data carrier in which, in contrast with the data carrier according to FIG. 1, the second logic circuit 40 has an autonomous configuration, i.e., it is not connected to the supply voltage contacts VCC, VSS. The second logic circuit 40 obtains its supply energy directly from the clock signal and, for this purpose, may contain, for example, a rectifier.

Unlike the data carrier according to FIG. 1, a contactless interface circuit 12 is represented as containing both the rectifier and smoothing network and the data-pre-processing parts of the circuit. Data lines to the first logic circuit 1 are provided for this purpose. In order to protect the first logic circuit 1 from overloading in contactless operation, the data carrier according to FIG. 2 also has an AC-voltage limiting circuit 8 as well as a rectifier-voltage limiting circuit 9.

Due to the distance-dependent strong fluctuations in the amplitude of the operating voltages VDD, VSS, a voltage regulator 10 is provided, which, using a capacitor CL, keeps the voltage across the first logic circuit 1 to a value of, for example, 2.1 volts.

Because the voltage regulator 10 would also regulate the supply voltage in operation with contacts of the contact bank 3, which voltage is usually higher than the supply voltage in contactless operation, it would be severely overloaded and possibly even destroyed. Accordingly, in a development according to the invention, it is either switched off by the output signal of the second logic circuit 40 in the presence of a clock signal at the contact bank 3 or is set to such a high regulating voltage that it cannot be overloaded.

The voltage limiter circuits and the voltage regulator may, of course, also be used in a data carrier according to FIG. 1. All the parts of the circuit are usually realized as an integrated circuit on a single semiconductor chip. It is, of course, also possible to use a plurality of semiconductor chips to make the circuit.

In some cases, it may be desired to have a greater energy store available for contactless operation than can be produced by integrated circuit technology. Accordingly, in an alternative embodiment of the invention, external terminals 11 may be led to the outside of the circuit in order to connect it to an external capacitor.

I claim:

1. A data carrier comprising:

a first logic circuit;

a contactless interface circuit;

at least one coil in which a signal is induced, said at least one coil connected to said first logic circuit through said contactless interface circuit;

said contactless interface circuit obtaining from the induced signal at least one DC supply voltage, a clock signal and a data signal corresponding to a modulation of the induced signal;

a controllable switching element having a control input;

contacts for receiving the at least one DC supply voltage, the clock signal, and the data signal, said contacts being connected to said first logic circuit and having at least one supply-voltage contact receiving the at least one DC supply voltage and a clock-signal contact receiving the clock signal, said at least one supply-voltage contact being connected to said first logic circuit through said switching element; and a second logic circuit having an input side and an output side, said input side connected to said clock-signal contact and said output side connected to said control input of said switching element.

2. The data carrier according to claim 1, wherein said second logic circuit has a rectifier element for obtaining a supply voltage from the clock signal.

3. The data carrier according to claim 1, wherein said second logic circuit is connected to said at least one supply-voltage contact.

4. The data carrier according to claim 1, including a voltage regulator having a regulator control input, said voltage regulator being connected upstream of said first logic circuit, said output side of said second logic circuit being connected to said regulator control input.

* * * * *